Feb. 18, 1936. B. B. GEMENY 2,030,953
AUTOMATIC VARIABLE PITCH PROPELLER
Filed Feb. 14, 1934 3 Sheets-Sheet 1
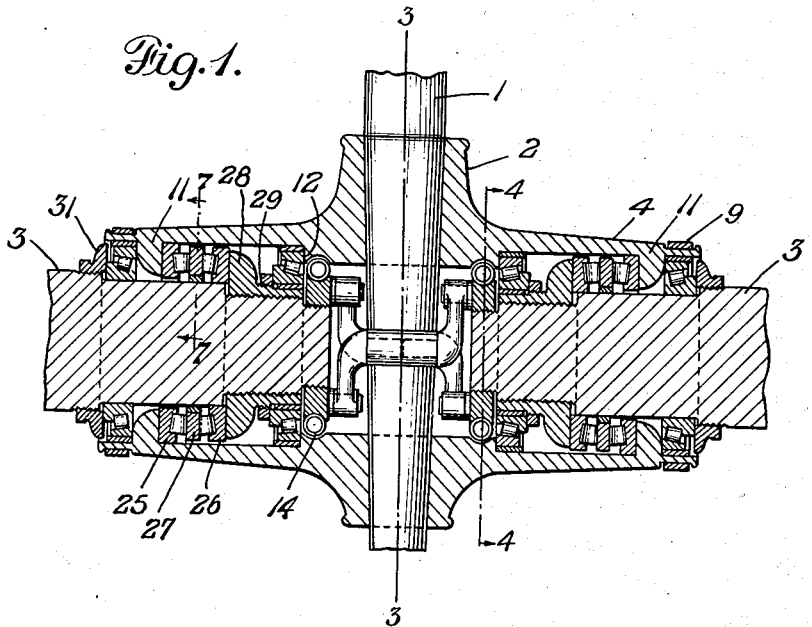
Fig. 1.
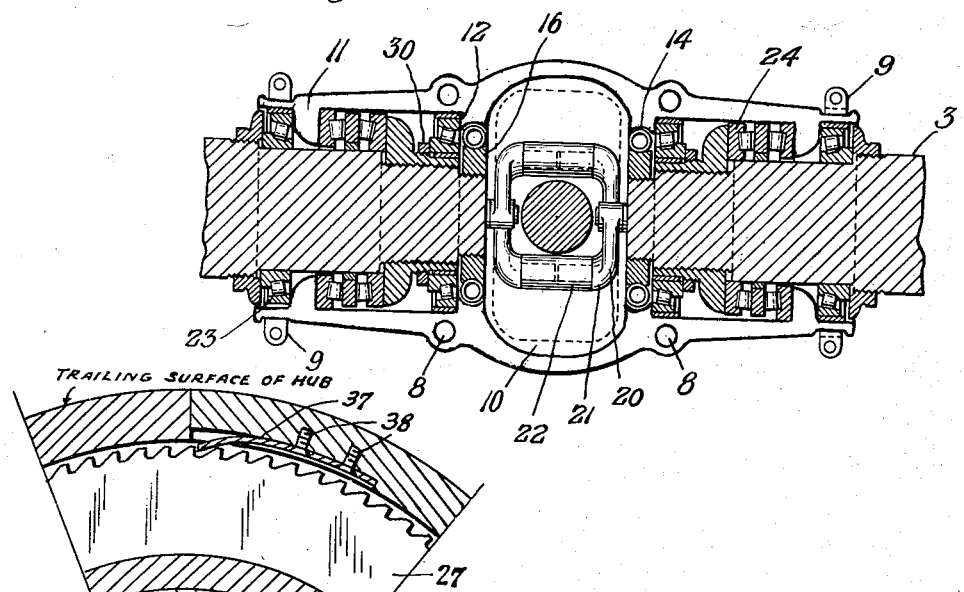
Fig. 2.
Fig. 7.
TRAILING SURFACE OF HUB
DIRECTION OF SPRING PRESSURE
Inventor
Blaine B. Gemeny,
By Earle D. Crummond
Attorney Feb. 18, 1936.   B. B. GEMENY   2,030,953
AUTOMATIC VARIABLE PITCH PROPELLER
Filed Feb. 14, 1934    3 Sheets-Sheet 2

Inventor
Blaine B. Gemeny,

By Earle D. Drummond
Attorney

Patented Feb. 18, 1936

2,030,953

UNITED STATES PATENT OFFICE 2,030,953

AUTOMATIC VARIABLE PITCH PROPELLER

Blaine B. Gemeny, Washington, D. C., assignor of one-third to Earle D. Crammond, Washington, D. C.

Application February 14, 1934, Serial No. 711,245

18 Claims. (Cl. 170—162)

The invention relates to improvements in automatic variable-pitch propellers, and more particularly to a propeller for air craft and one in which the pitch is automatically self adjusted under load and operating conditions, and one in which the weight has not been materially increased over that of a standard fixed propeller.

Decided advantages may be gained by the use of variable pitch propellers but, in structures heretofore produced, such advantages have been largely offset by the necessarily increased weight, complicated operating means such as gearing and fluid pressure devices to obtain the variable pitch characteristics, and by the extreme high cost of production. Furthermore, nearly all of the variable pitch propellers hitherto produced depend on the pilot or operator for their variable pitch control.

In air craft propellers designed to obtain a high propulsive efficiency, or in other words to obtain a high ratio of useful to engine power, the $$\frac{L}{D}$$

(lift over drag) ratio is highly important in connection with design of propeller sections for it affects the efficiency of the propeller. The highest propulsive efficiency is obtained when the angle of attack is approximately 2 degrees.

A fixed pitch propeller obtains ideal efficiency at substantially one combined engine and plane speed and is not entirely suitable for both high and low altitudes particularly when a supercharged engine is used. A fixed pitch propeller is specially designed for a fixed engine and plane speed and a sacrifice in performance results at certain other conditions of speed and altitude, whereas, with an automatic self-adjusting variable pitch propeller an ideal efficiency can be substantially obtained at normal and full throttle engine speeds regardless of the speed of the plane or wind velocity.

In a variable pitch propeller structure, the centrifugal force is dependent only on the speed of rotation of the propeller, whereas the air forces depend on several factors, including the speed of the engine, the speed of the plane and the wind velocities. The three factors, engine speed, centrifugal force and air force, become inseparably related in consideration of automatic variable pitch propeller design. It is one of the objects of this invention to provide an automatic variable pitch propeller dealing with the factors of engine speed, centrifugal force and air force, by providing in the propeller structure means for accurately balancing the centrifugal forces causing a turning of the propeller blades in the hub, and by providing means for utilizing and controlling the effective air forces in order to obtain a most efficient angle of attack at normal cruising speed and full throttle engine speed.

Another object of the present invention is to provide for the full automatic self-adjustment of a propeller blade to substantially the angle of maximum efficiency for the speed power coefficient, and the utilization of air pressure to change the angle of attack to the position of maximum propulsive efficiency at normal cruising or full throttle engine speeds.

Further objects of the invention are production of a propeller which has its pitch angle automatically self adjusted under load and operating conditions yet has a minimum increase in weight over that of a standard fixed propeller; and the production of a simplified propeller structure which may be easily and economically manufactured.

Among other objects of the invention are: the provision of a variable pitch propeller wherein the centrifugal forces are evenly distributed on a single bearing assembly within the hub and one in which all bearing adjustments may easily be made; the provision of a propeller having upper and lower cambers modified from that of present standard propellers to increase the distance of the center of air pressure from the leading edge; the provision of spring means within the hub which in conjunction with the air force adjust the blades to substantially the angle of maximum efficiency regardless of the speed of the plane or the velocity of the wind up to the maximum limit of the blade angle, thus automatically compensating for fluctuations of wind velocity; and the production of a propeller in which the thrust of the propeller will be in relation to the speed power coefficient for maximum efficiency throughout the entire maneuvers of the plane at normal cruising and full throttle speeds of the engine.

In carrying out the objects of this invention, it is necessary to provide for accurately balancing, at any position of the blade, the centrifugal force causing a turning of the blade in the hub of the propeller. This is accomplished by means of properly balanced and weighted arms cross connected to the hub ends of the blades of the propeller, which operate similarly to the weight balls on a Watt speed governor.

For purposes of illustration, with the symbol $b$ denoting the chord from leading edge to trailing edge, the center of gravity of the standard propeller blade occurs at a point .446b from the leading edge of the propeller section and the center of air pressure varies with the angle of attack of zero degrees at .42b from the leading edge to .3b at 15° so that the air pressure would cause the blade to rotate in a counterclockwise movement looking at the tip of the propeller if the blade were free to move in the hub, or in other words, to cause the blade to increase the angle of attack, thereby losing $$\frac{L}{D}$$

efficiency. By this invention, it is possible to use the air pressure to decrease the angle of attack to the position of maximum thrust for a given engine speed and springs are employed in cooperation with other structural features to resist the air pressure as is hereinafter more specifically described. To accomplish this it is necessary to decrease the distance of the center of gravity of the blade section from the leading edge and to increase the distance of the center of air pressure from the leading edge from that of the standard blade. The accurate control of the are force forms an important feature of my invention.

Decrease of the distance of the center of gravity of the blade from the leading edge can be accomplished in different ways depending upon a number of factors and mainly that of the material of construction.

The invention contemplates a propeller blade design wherein the distance of the center of the air pressure from the leading edge is increased and caused to fall below and in the rear of the center of gravity of the blade section. This feature of the propeller structure in conjunction with the balancing means and spring control at the hub form important features of the invention. This and further objects of the invention will become apparent to those skilled in the art from the detailed description of the invention hereinafter set forth in which reference is made to the accompanying drawings wherein like reference numerals represent same structures throughout the several figures of the drawings.

In the drawings,—

Fig. 1 represents a central plan section through the hub of the propeller.

Fig. 2 is a vertical section through the hub of the propeller taken at a right angle to the view of Fig. 1.

Figure 7 is a broken sectional view taken on the line 7—7, of Fig. 1, showing a means for providing for unidirectional rotation of the intermediate plate of the axial thrust bearing.

Figure 3:
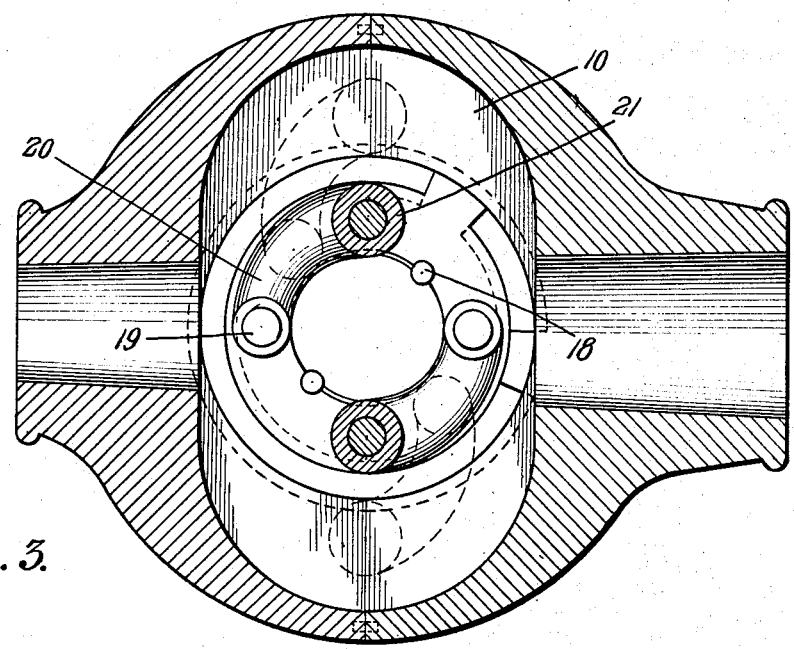
Fig. 3 is a central vertical section taken on the line 3—3 of Fig. 1, at a right angle to the engine shaft.

Referring to Figs. 1 and 2, the numeral 1 indicates a conventional engine shaft on which the propeller 2 is mounted. The propeller consists of the blades 3 whose roots extend into the hub 4. The hub is of the split housing type consisting of two counterpart portions or halves 5 and 6 which are arranged to be squeezed tightly around the blade shanks and bearings within the hub. The squeezing or clamping engagement is accomplished by through bolts 7 which pass through registering bolt holes 8 drilled through the counterpart portions and by clamping rings 9 at the ends of the housing. The counterpart portions are duplicates, machined along meeting faces to insure proper registry and cooperation with each other. The half portions are machined to provide a central transversely extending bore to receive the engine shaft in mounting the propeller. The hub members provide an enlarged central recess 10 to accommodate for movement therein, movable counter weights cross connected between the shanks of the propeller blades for balancing the centrifugal force tending to turn the blades in the hub and presently to be described. Extending inwardly thereof, each of the counterpart portions of the housing is provided adjacent the outer ends with integral semicircular flanges or bearing retaining members 11. These flanges or members are surfaced on opposite sides to receive and support bearings included in the hub assembly and serve to define, in conjunction with similarly surfaced, outwardly facing shoulders 12, recesses in which the bearings are received. Adjacent to the outwardly facing shoulders 12, the hub housing portions are provided with an inwardly extending lug 13, and on either side thereof with concave recesses 14 adapted to form, in conjunction with means on the blade shanks, a housing for a helical spring 15.

Figure 4:
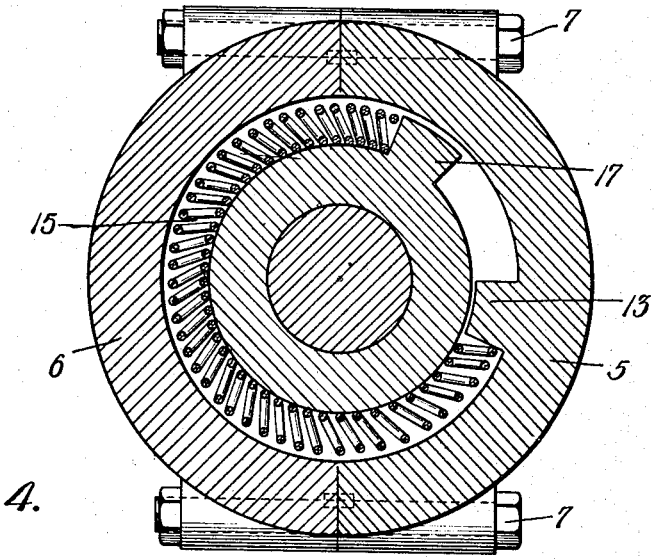
Fig. 4 is a vertical section taken on the line 4—4 of Fig. 1.

The blades 3 have their shanks provided with a series of reduced or stepped portions extending within the hub for cooperation with bearing and control members therein. The innermost stepped portions of the shanks are threaded to receive thereon, in adjustable relationship, annular lever members or crank collars 16 which have concave recesses in their outer periphery extending therearound from opposite sides of lugs 17. The concave recesses are arranged to register with the recesses 14 in the hub sections and form therewith housings for the springs 15 which are interposed, respectively, between the lugs 13 on the hub housing and the lugs 17 on the crank collars. The lugs 13 and 17 are in overlapping relationship and cooperate as stops in limiting turning of the blade shanks in a clockwise direction as viewed in Fig. 4 of the drawings. The springs 15, interposed between the lugs on the hub and on the annular lever members, normally tend to turn the blade shanks in a clockwise direction but allow turning of the shanks in a counterclockwise direction under forces tending to compress the springs.

The crank collars 16 are adjusted with respect to the hub housing by screw threaded adjustment along the reduced shanks of the blades, and are held in adjusted positions by means of keys 18 engaging keyways in the blade shanks and the collars—see Fig. 3. This precludes any movement of the collars with respect to the blades after proper adjustment has been made.

The members 16 are provided at diametrically opposed points with the stub shafts 19 extending into the central recess of the hub housing. The stub shafts 19 have pivotally mounted thereon weight lever arms 20 extending in opposite directions from their pivotal point to a point 90° around the axis of the blade shanks where right angle projections 21 on the arms extend respectively above and below and transversely of the engine shaft passing through the hub. Two weights 22 are arranged to have a sliding fit over the projections on the lever arms and each of these weights serve to cross connect one of the lever arms extending from one crank collar with one of the arms extending from the opposite crank collar, so that the lever arms will be cross connected in pairs on opposite sides of the engine shaft at points 90° removed from the point of pivot of the arms on the collars. The arms and counterweights, being pivoted on the stub shafts on the collars, will move together in opposite directions. They hang freely in position and the structure is such as to require no screws, springs or other mechanism to hold the weights and arms in assembly.

The purpose of the counterweights is to accurately balance at any position of the blades the centrifugal force that tends to cause the blades to turn in the hub. There are two controllable factors in providing for accurate counterweight balance; one is the weight of the arms and the sleeve counterweight itself, and the other is the distance from the center of the hub to the center of the stub shaft on the crank lever members which determines the leverage and throw or the extreme open position of the weights. The full open position of the counterweights corresponds to the full open position of the blade angle so that the centrifugal force of each is in exact relation to the blade angle at all times. The counterweights are arranged so as to offer no obstruction to the engine shaft at any time.

The size and diameter of the collars will be determined by the required lever arm for the counterweights, and the exact shape of the hub will be governed by the necessary clearance for counterweights, spring housings and bearings. As the diameter of the collar is increased, the greater is the leverage of the counterweights, permitting finer tuning of the counterweight action; also, the collars act as part of the housing for the spring and are determining factors in the design of the spring, if the springs are located in the position as shown.

The distance from the center of air pressure on a blade section and the center of gravity on the blade section is so small that the leverage of the air force causing turning of the blade in the hub is also small; therefore, the spring force required to regulate the air force will be relatively small and does not require springs of excessive dimensions. Adjustment of spring length and tension can be obtained by introducing adjusting means between the spring and lugs. The springs tend to hold the blades in an extreme open position or maximum blade angle until air pressure is sufficient to force the blades to a less blade angle and to offer a positive resistance to the air force closing the blade angle to less than the calculated angle of attack at normal cruising speed of the engine. In cooperation with the spring control, it will be noted that the movement of a blade in one direction is limited by engagement of the lugs, as previously described, and in the opposite direction by engagement of the counterweights with the engine shaft.

The bearings for each of the propeller blades consist of two radial thrust anti-friction roller bearings 23 and an axial thrust anti-friction roller bearing 24 at each end of the hub housing. The axial thrust roller bearings are positioned within the hub housing in engagement with the inwardly directed bearing retaining flange 11. This bearing consists of the two outer roller race plates 25 and 26 and the single intermediate roller plate 27 interposed between the rollers. The bearing assembly is adjusted to position against the retaining flange by means of a collar 28 which has a screw-threaded relationship with one of the reduced or stepped portions of the blade shanks. The collar 28 serves as an adjusting member for the main thrust bearing and has a reduced portion 29 screw-threaded in part and extending within the inner member of one of the radial thrust bearings positioned against the outwardly facing shoulder 12. An adjusting means 30 has threaded engagement with the reduced portion 29 of the main adjusting collar 28 to provide for clamping engagement of the inner radial thrust bearing against the outwardly facing shoulder 12 on the hub portion. The other radial thrust bearing is positioned within the outer end of the hub against the inwardly directed bearing retaining flange 11, where it is held in position of adjustment by an internally threaded collar 31 engaging a threaded portion on the shank of the propeller blade. The bearing assemblies are duplicated at each end of the hub and the above description suffices for each assembly. With the arrangement described, it will be noted that very tight adjustments of the bearings can be obtained and yet have all of the main centrifugal force acting on each blade effectively applied to a single axial thrust bearing. The radial thrust bearings take all of the torque and may be positioned as tightly as possible against their seats on the hub housing by the adjusting collars, yet when in operation, the centrifugal force, which amounts to many thousand pounds for each propeller blade, is applied to the axial thrust bearing, it will tend to relieve the radial thrust bearings from their original tight adjustment sufficiently to enable the centrifugal thrust to be taken solely by the axial thrust bearings.

In view of the large pressures on the axial thrust bearing assembly 24, it is contemplated that the intermediate plate positioned between the rollers will be so arranged as to cause to move slightly in one direction so that it will not remain in a constant position, allowing the rollers to have a tendency to seat therein. For this purpose, the intermediate plate 27 may be toothed on its outer periphery as shown in Fig. 7 and a simple pawl 37 may be provided on the housing extending into engagement with the toothed periphery of the plate so that in operation the plate may be actuated into different positions. The pawls, one for each axial thrust bearing, may be located in suitable recesses in the hub sections, preferably at the trailing side of the housing, and may be secured in position in the recesses by screws 38 or by other suitable fastening means.

Figure 6:
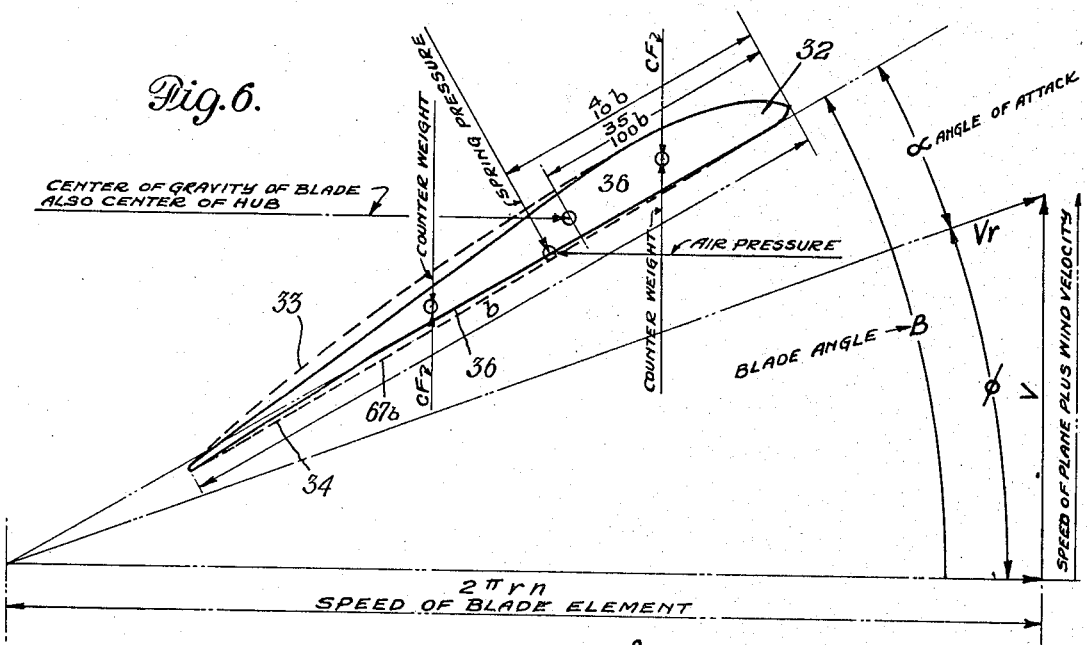
Fig. 6 is a diagram of the blade section at .75 R illustrating the centrifugal and aerodynamic forces on a blade element for purposes of illustrating the principles involved in providing for the self adjustment of the blade to the ideal angle of attack.

As previously pointed out, one of the important features of this invention is the utilization of air pressure to decrease the angle of attack to the position of maximum efficiency. This is done by decreasing the distance of the center of gravity of the blade from the leading edge and increasing the distance of the center of air pressure from the leading edge from that of present standard propeller blades. One manner of accomplishing this is chosen for purposes of illustration in Figs. 5 and 6, wherein the blade 32 represents a forged aluminum blade section modified in comparison with a standard propeller section 0.12 thickness ratio based on the well known Royal Air Force 6, air foil section, represented by the dotted lines 33 of the figure. Changing position of the center of gravity of the blade from a position .446b, (b indicates the breadth of blade from leading edge to trailing edge) from the leading edge to .35b so that the center of air pressure will occur below and at the rear of the center of gravity of the blade, is accomplished from that of the standard section by the modifications indicated in full lines in Fig. 6. This modification consists of a reduction of the upper camber from a point .3b from the leading edge to the trailing edge, and also a change in the lower camber to be described in connection with the method of increasing the distance of the center of air pressure from the leading edge. Other methods than that shown, of changing the position of the center of gravity, consists principally in decreasing material in trailing sections and increasing the material in leading sections. In hollow steel laminated blades, this can be done with a slight change in the shape of the blade. In Fig. 6, increasing the distance of the center of air pressure from the leading edge can be accomplished by shaping the blade to slightly increase the drag at the trailing edge, as at 34. As illustrated, this is accomplished by a modification to produce a slight concave lower camber as indicated at 36. This consists of sloping the lower camber approximately 1° to a point .67b from the leading edge and connecting the same with the trailing edge, introducing therein a smooth curve between the sloping surfaces. This will give an increased lift to the blade section at a small increase in drag, the object being to increase the drag at the trailing edge sufficient only to increase the distance of the center of air pressure from a point approximately .3b at 15-degree angle of attack to a minimum $$\frac{4}{10}b$$

This accomplishes the desired result of having the center of air pressure fall below the center of gravity of the blade section, causing the blade to revolve clockwise when looking from the tip to the hub. This reduces the angle of attack to that calculated at normal cruising speed of the engine and proportionately less at full throttle speed of the engine at sea level and a proportionate increase in these angles at higher altitude due to the difference in air density.

The coil springs are designed to hold the blade at a predetermined maximum blade angle shown in this instance as of 55°, which will vary as air pressure increases until at normal cruising engine speed the angle of attack will be decreased by the air pressure to a minimum of 2°, and proportionately less at full throttle speed. It is therefore at full throttle and cruising speeds on the engine that the propeller will have its maximum $$\frac{L}{D}$$

efficiency. The highest propulsive efficiency being obtained when the angle of attack is approximately 2°, at full throttle and cruising speeds, the propeller will give a maximum thrust in relation to the speed power coefficient for maximum efficiency, regardless of the speed of the plane, velocity of wind, or altitude up to the limit of the geometrical pitch. In diving, the blade angle will increase, thereby preventing racing of the motor, and in climbing the angle of attack will decrease to that of the maximum $$\frac{L}{D}$$

efficiency, with no loss in engine power, as is the case with a fixed propeller. Since the blade automatically adjusts itself to a predetermined air pressure, the torque will remain uniform, preventing the racing of the engine or overloading; thereby increasing the life of the engine. The arrangement enables the pilot to exercise complete control of the action of the propeller through the speed of the engine and the pilot is not required to make separate adjustments of the propeller by means of hand controlled mechanical contrivances, thus lending materially to the safety of airplane operation.

Fig. 6 shows the position of the center of gravity of the blade section at a point .35b from the leading edge. This center of gravity has been previously described as located at .446b from the leading edge in a standard propeller blade section. Fig. 6 indicates the center of centrifugal force for the leading section and trailing section of the blade. The direction of the centrifugal force is indicated by straight lines shown in the drawings. These two forces must be accurately balanced by opposing forces at all blade angles, varying in magnitude in direct proportion to variation in magnitude of the centrifugal force on the propeller blades. These opposing forces are indicated by straight lines directly opposite the lines indicating the centrifugal forces and control of these forces is provided for by means of the counterweights previously described.

Fig. 6 shows the center of air pressure at $$\frac{4}{10}b$$

whereas for a standard propeller blade this varies in position from approximately .42b from the leading edge at an angle of attack of 0° to .3b at 15°. In the modified blade structure described for purpose of illustration and in other blade sections embodying features of this invention, this center of air pressure is always to occur at a greater distance from the leading edge than the center of gravity to obtain a desired control over the air force. The center of air pressure occurring below the center of gravity of the blade section would cause the blade to turn in the hub so as to reduce the angle of attack, which is the desired action. However, to control the amount of reduction of this angle of attack, the springs 15 previously described act to hold the blade at an angle of attack predetermined by the propeller designer for normal cruising and full throttle speeds of the engine. It will be obvious from the foregoing description, that the springs operating on the blade shanks within the hub perform their function in conjunction with the air force to adjust the blades to the ideal angle of attack at normal and full throttle speeds of the engine, regardless of the speed of the plane or the velocity of the wind up to the limit of the blade angle at 55° so that the fluctuations of wind velocity are automatically compensated for. In taking off, diving, climbing, or in acrobatics, the blades will automatically adjust themselves to the the ideal angle of attack at normal and full throttle speeds, or, in other words, the thrust of the propeller will be maximum in relation to the speed power coefficient for maximum efficiency throughout the entire range of use in such usage.

The blade section shown in Fig. 6, is that for a forged aluminum blade which has excellent air foil characteristics. The exact blade structure shown, however, is for purpose of illustration only, of a particular blade section which will have its best air foil characteristics with the position of the center of gravity .35b from the leading edge. The foregoing description of a particular propeller blade taken in comparison with a well known propeller blade section has been selected to illustrate the invention, which is not, however, limited to the particular blade structure shown. Other blade structures and modifications of standard blade structures other than particularly referred to will become obvious to those skilled in the art, but the invention is inclusive of propeller blades designed with suitable contours and cross sections to provide the center of gravity thereof at a lesser distance from the leading edge than the center of the air pressure on the blade section. The positioning of the center of gravity and the center of air pressure from the leading edge in blade sections of different material and other than that shown so that the center of air pressure falls below and in the rear of the center of gravity, can readily be obtained. The invention, therefore, is not particularly limited to the exact shape of the propeller section shown.

Figure 5:
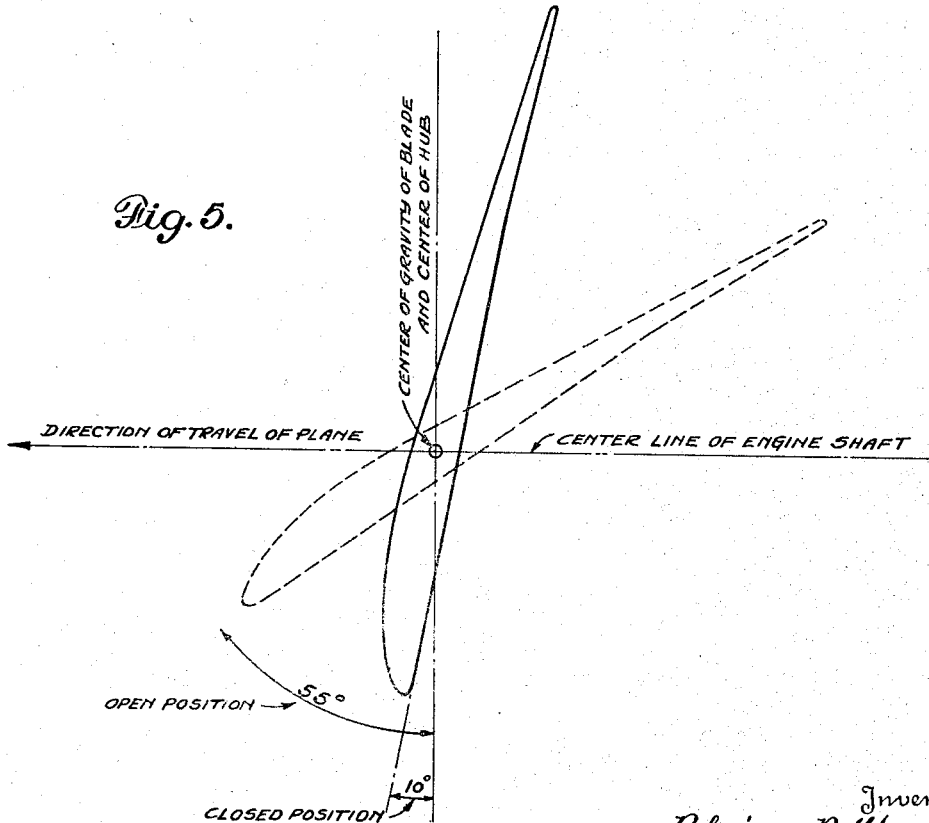
Fig. 5 is a vertical section through the propeller blade of the invention at .75 R (radius) looking from the hub toward the tip of the blade and showing the maximum and minimum blade angle.

The center of air force being below and back of the center of gravity of the blade sections, in the operation of the propeller above described, the air force is utilized to decrease the angle of attack under control of the springs tending to hold the blade in the extreme open position or maximum blade angle of 55° as illustrated by dotted lines in Fig. 5. The type and design of spring employed will be determined by the conditions dealt with in each case of structure variation, but in all cases the result will be that described in connection with the illustrated embodiment of the invention. The centrifugal forces acting on the propeller blades tend to turn the blades in the hub, this action being counterbalanced by the free swinging weights of the governor. The governor and the springs, together with the utilization of the air force by suitably designed propeller blades, result in a self-adjusting variable pitch propeller free from gearing and other pitch varying agencies, and further results in a propeller having a minimum number of parts so that assembly and adjustment thereof is a simple matter.

While the invention is hereinabove described in connection with a preferred embodiment, it is to be understood that the words which have been used are words of description rather than of limitation, and that changes within the purview of the appended claims may be made without departing from the true scope and spirit of the invention in its broader aspects.

Having described and illustrated my invention, in accordance with the requirement of the statutes, I claim:

1. In an automatic self-adjusting variable pitch propeller having a hub portion, and a plurality of blades having shanks mounted for turning movement in the hub for variation of the pitch of the propeller, weight lever means connecting relatively opposite sides of different blades for balancing out centrifugal forces tending to turn the blades in the hub when the propeller is operated, and means cooperating with the blades controlling the pitch of the propeller in relation to the air forces acting thereon when the propeller is operated.

2. An automatic self-adjusting variable pitch propeller comprising a hub portion arranged for mounting on an engine shaft, a plurality of blades having their shanks mounted for turning movement within the hub, self-adjusting means cooperating with the blades to control the turning movement of the blades under the influence of air forces acting thereon to maintain the propeller at the most efficient angle of attack both in cruising and full throttle engine speed, and means including freely movable weight lever members interconnecting the blades within the hub for balancing out centrifugal forces tending to turn the blades in the hub when the propeller is rotated whereby pitch variation of the propeller in operation is obtained in conjunction with the self-adjusting means only by the air forces acting on the blades of the propeller.

3. In an automatic variable-pitch propeller of the character described, a split hub housing, means for clamping the housing together, propeller blades having their shanks extending into the hub housing and turnable therein to vary their effective pitch, spring means between the propeller shanks and the housing for controlling blade angle changes caused by air forces acting on the blades, and counterbalancing means for balancing centrifugal force acting on the blades that would cause a turning movement of the blades in the hub, said counterbalancing means including freely movable swinging weights interconnected with the blade shanks at points on relatively opposite sides of the longitudinal axes of the blades.

4. An automatic self-adjusting variable pitch propeller comprising a hub portion arranged for mounting on an engine shaft, a plurality of blades having their shanks mounted for turning movement within the hub portion for variation of the pitch of the propeller, each of said blades being constructed so the center of the air forces when the propeller is operated will always be below and at a greater distance from the leading edge than the center of gravity of the blade section, so that air forces acting thereon tend to decrease the angle of attack, a weight governor enclosed within the hub for balancing centrifugal forces on the blades that would cause a turning movement of the blades in the hub, and means enclosed by the hub for controlling the decrease of the angle of attack by air forces on the blades.

5. A self-adjusting variable pitch propeller comprising a hub having metal sections, means for clamping the sections of the hub together, propeller blades having shank portions extending into the hub for turning movement therein, a plurality of adjustable anti-friction thrust bearings cooperating with the hub and blade shank portions for positioning and retaining the shanks against longitudinal movement in the hub, a control element fixed to the end of each blade shank, spring means interposed between each control element and the hub, and a plurality of counterbalance weights supported on lever arms cross connected between the control elements.

6. A self-adjusting variable pitch propeller comprising a hub having metal sections, means for clamping the sections of the hub together, propeller blades having shank portions extending into the hub for turning movement therein, a plurality of adjustable anti-friction thrust bearings cooperating with the hub and blade shank portions for positioning and retaining the shanks in the hub, a control element fixed to the end of each blade shank, a spring interposed between each control element and the hub biasing each propeller blade to an extreme open position, a plurality of lever arms pivotally mounted on each control element, and a plurality of weights cross connecting separate lever arms on one control element with those of the other element to balance centrifugal forces acting on the blades.

7. An automatic self-adjusting variable pitch propeller comprising a hub having counterpart metal sections, means for fastening the sections together, a plurality of propeller blades having shanks mounted for turning movement in the hub and having blade sections whereon the center of air pressure is at a greater distance from the leading edge than the center of gravity of the blade sections, and automatic means enclosed within the hub cooperating with the blade shanks for controlling the air and centrifugal forces which tend to turn the blades in the hub, whereby the blades automatically obtain the most efficient angle of attack in response to engine speed.

8. In a self-adjusting variable pitch propeller, a hub, a plurality of propeller blades having shanks extending within the hub, means supporting and retaining the blade shanks within the hub but permitting limited turning movement therein, and means enclosed within the hub for automatically controlling air and centrifugal forces on the blades to automatically obtain the most efficient angle of attack, said means including a weight governor cross connected between the shanks of the blades and spring means acting between the blade shanks and the hub.

9. In a self-adjusting variable pitch propeller, a hub casing having metal sections, means for fastening the sections together, a plurality of blades having shanks extending into the hub, anti-friction bearings for supporting and retaining the shanks in the hub, a plurality of spaced abutments on the hub casing, a control element detachably connected with the end of each blade shank, a coil spring interposed between each control element and one of the abutments on the hub casing tending to turn the blade shank in the hub, and a centrifugal weight governor including movable lever arms interconnected between points on said control elements within the hub casing on relatively opposite sides of the longitudinal axes of said blades.

10. In a self-adjusting variable pitch propeller, a hub casing having metal sections, means for fastening the sections together, a plurality of blades having shanks extending into the hub, anti-friction bearings for supporting and retaining the shanks in the hub, a collar screw threaded on the end of each hub shank having a radially extending lug and a concave periphery, said hub casing having two inwardly extending lugs and concave recesses extending around the interior of the hub casing in the plane of the lugs and in opposed relation to the concave recesses in the periphery of the control elements, coil springs interposed between the lugs on the collars and the lugs on the hub casing and housed therebetween in the cooperating concave recesses of said parts, and a centrifugal weight governor having lever arms pivotally connected with said collars.

11. In an automatic variable pitch propeller having a plurality of blades mounted for turning movement in a hub, a lever control member mounted on the end of each blade within the hub, means connecting relatively opposite portions of said lever control members and including freely movable weight members for automatically balancing out centrifugal forces tending to turn the blades in the hub during rotation of the propeller, and means for automatically varying the pitch of the blades in accordance with the air forces acting thereon during operation of the propeller.

12. In an automatic variable pitch propeller having a plurality of blades with shanks mounted for turning movement in a hub under the influence of air forces acting on the blades when the propeller is rotated, means including movable weight members within the hub interconnecting the blade shanks for counterbalancing centrifugal forces which tend to turn the blades in the hub during rotation of the propeller, and resilient means cooperating with air forces acting on the blades during operation of the propeller to automatically vary the pitch of the blades in accordance with air forces acting thereon.

13. In an automatic variable pitch propeller having a hub and a plurality of blades with the centers of the air pressures thereon during operation of the propeller disposed with respect to the center of gravity of the blade sections so as to decrease the angle of attack under the effect of air forces acting on the blades, resilient means automatically tending to increase the angle of attack in opposition to the said air forces, and means associated with the blades for automatically counterbalancing centrifugal forces tending to turn the blades when the propeller is rotated, said last mentioned means including a weight governor cross connected with the blades at points on relatively opposite sides of the longitudinal axes of the blade shanks.

14. An automatic self-adjusting variable pitch propeller comprising a sectionalized hub, means for fastening the sections of the hub together, a plurality of blades having shanks mounted for turning movement in the hub and having blade sections whereon the center of the air forces is spaced from the center of gravity of the blade so as to result in turning the blades in the hub when the propeller is operated, a lever control member mounted on the shank of each blade within the hub, resilient means for controlling the turning of the blades under the influence of the air forces, and means including a movable weight governor connecting said lever control members at points on opposite sides of the longitudinal axes of the blades for balancing out the centrifugal forces which tend to turn the blades when the propeller is rotated.

15. In a variable pitch propeller having a sectionalized metal hub the sections of which having formed thereon integral inwardly and outwardly facing supporting shoulders, means for clamping the hub sections together, a plurality of blades positioned for turning movement in the hub, means supported by the integral shoulders on the hub sections for positioning and supporting each blade in the hub, said means including a plurality of spaced anti-friction radial thrust bearings positioned against certain integral shoulders on the hub, and an axial thrust anti-friction bearing positioned intermediate the spaced radial thrust bearing and seating against an inwardly facing shoulder.

16. An automatically variable pitch propeller having a hub formed with integral bearing supporting shoulders within the hub, and a plurality of blades positioned for rotation therein, means for supporting and retaining each blade within the hub, said means including spaced anti-friction bearing assemblies seated on said bearing supporting shoulders within the hub and so arranged that the axial thrust of each blade is transferred to a single bearing assembly when the propeller is operated, means for varying the relative positions of elements of the single bearing assembly to avoid seating of the bearings, and means for automatically varying the pitch of the blades when the propeller is operated.

17. In a variable pitch propeller having a hub and a plurality of blades positioned for rotation therein means for supporting and retaining each blade within the hub, said means including spaced adjustable anti-friction radial thrust bearings positioned against outwardly facing shoulders integral with the hub and an adjustable axial thrust bearing positioned against an inwardly facing shoulder on the hub whereby the axial thrust of each blade is transferred to the single axial thrust bearing when the propeller is rotated, and means enclosed within the hub for varying the pitch of the blades when the propeller is operated.

18. A variable pitch propeller having a hub and a plurality of blades positioned for rotation therein, means for varying the pitch of the blades during operation of the propeller, means for rotatably retaining the blades within the hub when the propeller is rotated, said means including integral projections formed on the hub and a unitary anti-friction axial thrust bearing for each blade seating against said projections, said bearing having a plurality of races with anti-friction elements therebetween, and means cooperating with the anti-friction bearings for providing relative movement of the races to avoid seating of the anti-friction elements in a race of the bearing under centrifugal forces acting through the propeller blades.

BLAINE B. GEMENY.